US012345991B2

United States Patent
Liu et al.

(10) Patent No.: US 12,345,991 B2
(45) Date of Patent: Jul. 1, 2025

(54) ELECTROCHROMIC GLASS AND METHOD FOR MANUFACTURING SAME

(71) Applicant: NANTONG FANHUA NEW MATERIALS TECHNOLOGY CO., LTD., Jiangsu (CN)

(72) Inventors: Jiang Liu, Jiangsu (CN); Qunhua Wang, Jiangsu (CN); Shunqing Ji, Jiangsu (CN)

(73) Assignee: NANTONG FANHUA NEW MATERIALS TECHNOLOGY CO., LTD., Nantong (CN)

( * ) Notice: Subject to any disclaimer, the term of this patent is extended or adjusted under 35 U.S.C. 154(b) by 631 days.

(21) Appl. No.: 17/640,374

(22) PCT Filed: Aug. 27, 2020

(86) PCT No.: PCT/CN2020/111549
§ 371 (c)(1),
(2) Date: Mar. 4, 2022

(87) PCT Pub. No.: WO2021/043048
PCT Pub. Date: Mar. 11, 2021

(65) Prior Publication Data
US 2022/0334444 A1  Oct. 20, 2022

(30) Foreign Application Priority Data
Sep. 6, 2019  (CN) .......................... 201910851239.2

(51) Int. Cl.
*G02F 1/161*  (2006.01)
(52) U.S. Cl.
CPC .................. *G02F 1/161* (2013.01)

(58) Field of Classification Search
CPC ....................................................... G02F 1/161
USPC ....................................................... 359/275
See application file for complete search history.

(56) References Cited

U.S. PATENT DOCUMENTS

| 2002/0149829 | A1 | 10/2002 | Mochizuka et al. |
| 2014/0247475 | A1 | 9/2014 | Parker et al. |
| 2018/0299741 | A1 | 10/2018 | Giron et al. |

FOREIGN PATENT DOCUMENTS

| CN | 104656336 A | 5/2015 |
| CN | 107473607 A | 12/2017 |
| CN | 108803183 A | 11/2018 |
| CN | 109613782 A | 4/2019 |
| DE | 19737978 A1 | 3/1999 |

(Continued)

OTHER PUBLICATIONS

International Search Report of PCT Patent Application No. PCT/CN2020/111549 issued on Dec. 1, 2020.

(Continued)

*Primary Examiner* — Wyatt A Stoffa
*Assistant Examiner* — Grant A Gagnon

(57) ABSTRACT

Provided is an electrochromic glass, including a first transparent substrate, a second transparent substrate and a functional stacked layer. The functional stacked layer includes a first conductive layer, an electrochromic stacked layer and a second conductive layer, wherein the first conductive layer, the electrochromic stacked layer and the second conductive layer are sequentially arranged on the first transparent substrate and are located between the first transparent substrate and the second transparent substrate. Also provided is a method for manufacturing the electrochromic glass.

14 Claims, 1 Drawing Sheet

(56) References Cited

FOREIGN PATENT DOCUMENTS

JP  H06092695 A  4/1994
KR  20010023393 A  3/2001

OTHER PUBLICATIONS

European Search Report of European Patent Application No. 20860509.7 issued on Oct. 20, 2023.

ELECTROCHROMIC GLASS AND METHOD FOR MANUFACTURING SAME

FIELD OF THE INVENTION

The present disclosure relates to the field of electrochromic glass, and in particular to electrochromic glass and a method for manufacturing same.

BACKGROUND OF THE INVENTION

Electrochromism refers to a phenomenon of stably and reversibly color change of optical attributes (reflectivity, transmittance, absorptivity, etc.) under the action of an external electric field. The electrochromic technology has developed for more than four decades. Electrochromic device (ECD) has broad application prospects in the fields of smart windows, displays, spacecraft temperature control modulation, vehicle glare-free rearview mirrors, weapon equipment stealth and other fields due to its characteristics of continuous tunability for transmitted light intensity, low energy loss, an open circuit memory function, etc. ECD-based glass, as a new type of smart window, is able to adjust the intensity of incident sunlight according to a requirement for comfort, so as to effectively reduce energy consumption, which shows a significant energy-saving effect. With the continuous improvement of people's requirements for consuming products, the ECD has shown a huge market prospect and application value in the fields of automobiles, home appliances and furniture, aerospace, rail transit, green buildings, etc. Recently, electrochromic products have attracted more and more attentions at home and abroad, and is a new generation of efficient energy-saving building product following heat-absorbing glass, heat-reflecting coated glass and low emissivity glass.

Vacuum glass is a new type of highly-processed glass product, and is a cutting-edge product in the glass industry of our country that rarely has independent intellectual property rights. The development and promotion of the vacuum glass conform to the independent innovation policy of our country, and also conform to the energy-saving policy that is strongly advocated by the country. The vacuum glass has a huge effect on energy saving and sound insulation, thus having a good development potential and prospect. By combining these two advantages, the vacuum glass is a new generation of curtain wall glass for future buildings, which has ultra-high performance and user experience.

However, electrodes of most existing electrochromic vacuum glass, are directly extend into an electrochromic element and are connected to a conductive layer, and then the glass is enclosed after the electrodes are led out by using leads. In this way, the degree of vacuum and the sealing performance of the vacuum glass will be reduced, which will affect the quality of product.

SUMMARY OF THE INVENTION

In view of the above-mentioned defects in the prior art, the problem to be solved by the disclosure is to change the manner of arranging electrodes on electrochromic elements, which will simplify production steps and reduce production complexity without introducing a lead inside an electrochromic apparatus.

In order to achieve the above-mentioned objective, the disclosure provides an electrochromic glass, including a first transparent substrate, a second transparent substrate and a functional stacked layer. The functional stacked layer includes a first conductive layer, an electrochromic stacked layer and a second conductive layer.

The first conductive layer, the electrochromic stacked layer and the second conductive layer are sequentially arranged on the first transparent substrate and are located between the first transparent substrate and the second transparent substrate.

The first conductive layer is provided with a first exposed area, a first conductive material is arranged in the first exposed area, and the end of the second conductive layer that is away from the first exposed area is provided with the first conductive material.

A second conductive material is arranged between the first transparent substrate and the second transparent substrate, the second conductive material is arranged along the periphery of the functional stacked layer, the second conductive material is in contact with the first conductive material, and the second conductive material is in sealed connection with both the first transparent substrate and the second transparent substrate.

Furthermore, the resistance of the electrochromic stacked layer<the resistance of the first conductive material<the resistance of the second conductive material<the resistance of the first conductive layer and the resistance of the second conductive layer.

Furthermore, the functional stacked layer further includes an inert gas layer, which is located between the functional stacked layer and the second transparent substrate.

Furthermore, a support column array is arranged between the first transparent substrate and the second transparent substrate, the support column array includes support columns, which are uniformly distributed, and the support columns are perpendicularly connected to the first transparent substrate and the second transparent substrate.

Furthermore, the support columns contain a third conductive material.

Furthermore, the functional stacked layer further includes a vacuum layer, which is located between the functional stacked layer and the second transparent substrate.

Furthermore, the functional stacked layer further includes an ion blocking layer.

The ion blocking layer contains a silicon oxide or a silicon aluminum oxide, the ion blocking layer is arranged on the second conductive layer, the end of the second conductive layer that is away from the first exposed area is provided with a second exposed area, and the first conductive material is arranged in the second exposed area Furthermore, the functional stacked layer further includes an isolating layer.

The isolating layer is arranged on the ion blocking layer, and components of the isolating layer contain at least one of the following: titanium nitride, aluminum nitride, silicon nitride and boron nitride.

Furthermore, the first conductive material and the second conductive material include a conductive slurry or a conductive adhesive, the conductive slurry and the conductive adhesive contain one or more of silver powder, nickel powder, copper powder, silver plating copper powder and carbon powder.

The disclosure also provides a method for manufacturing electrochromic glass, the method including:
 forming a functional stacked layer, depositing an electrochromic stacked layer on a first transparent substrate with a first conductive layer, and depositing a second conductive layer on the electrochromic stacked layer;
 forming a first exposed area on the first conductive layer;

coating a first exposed area with a first conductive material;

coating, with the first conductive material, the end of the second conductive layer that is away from the first exposed area;

coating along the periphery of the functional stacked layer with second conductive material, the second conductive material is in contact with the first conductive material; and aligning, heating and sealing a second transparent substrate with the first transparent substrate in a sealed manner.

Furthermore, when the second transparent substrate and the first transparent substrate are aligned, heated and sealed, the heating and sealing are performed in an insert gas atmosphere.

Furthermore, before the functional stacked layer is formed, the method further includes:

pasting a support column array on the first transparent substrate, where the support column array includes support columns, which are uniformly distributed, and the support columns are perpendicularly connected to the first transparent substrate and the second transparent substrate.

Furthermore, when the second transparent substrate and the first transparent substrate are aligned, heated and sealed, the heating is vacuum heating.

Furthermore, forming the functional stacked layer further includes:

after the second conductive layer is deposited on the electrochromic stacked layer, depositing an ion blocking layer on the second conductive layer by taking silicon or a mixture of silicon and aluminum as a target material;

coating, with the first conductive material, the end of the second conductive layer that is away from the first exposed area specifically includes:

forming a second exposed area at the end of the second conductive layer that is away from the first exposed area; and coating the second exposed area with the first conductive material.

Furthermore, forming the functional stacked layer further includes:

after the ion blocking layer is deposited on the second conductive layer, depositing an isolating layer on the ion blocking layer in a nitrogen atmosphere by taking pure or mixture of titanium, aluminum, silicon and boron as a target material.

The preparation method of the disclosure is simple, and has low investment cost, high controllability of the quality of a final product, good color change uniformity, simple and thin product structure, and great performance in sound insulation and low thermal conductivity, such that large-scale industrial production can be realized.

The concept, specific structures and resulting effects of the disclosure are further described below in conjunction with the drawings to fully understand the object, features, and effects of the disclosure.

BRIEF DESCRIPTION OF THE DRAWINGS

By reading the following detailed description made with reference to the drawings for non-limiting embodiments, the other features, objectives and advantages of the disclosure will become more apparent.

LIST OF REFERENCE SIGNS

Figure 1:
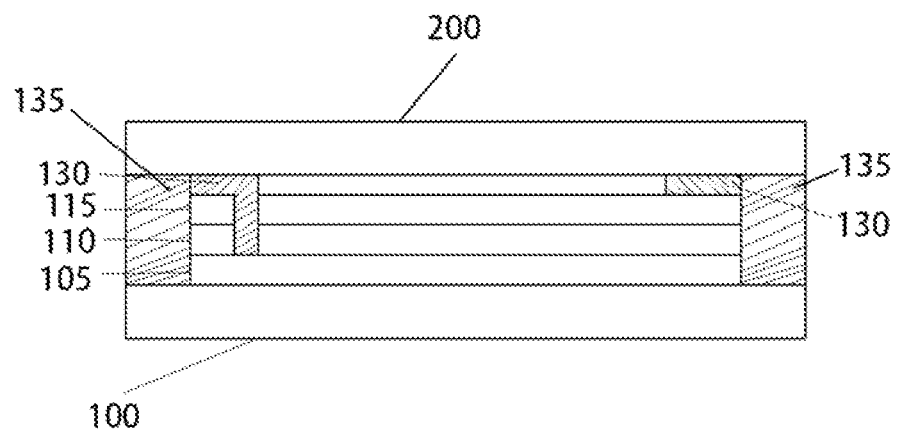
FIG. 1 is a structural schematic diagram of an embodiment of the disclosure.

100—first transparent substrate; 200—second transparent substrate; 300—support column; 105—first conductive layer; 110—electrochromic stacked layer; 115—second conductive layer; 120—ion blocking layer; 125—isolating layer; 150—vacuum layer; 130—first conductive material; and 135—second conductive material.

DETAILED DESCRIPTION OF THE EMBODIMENTS

Multiple preferred embodiments of the disclosure are described below with reference to the drawings of the description to make the contents clearer and easier to understand. The disclosure can be embodied in various forms of embodiments, and the scope of protection of the disclosure is not limited to the embodiments mentioned herein.

In the drawings, the same reference numeral indicates components having the same structure, and similar reference numerals indicate assemblies having similar structures or functions throughout. The size and thickness of each assembly shown in the figures are shown arbitrarily, and the disclosure does not define the size and thickness of each assembly. In order to make the illustration clearer, the thickness of the component in some places of the figures is appropriately exaggerated.

Embodiment One

FIG. 1 shows a structural section view of electrochromic glass. As shown in FIG. 1, the disclosure has a first transparent substrate 100 and a second transparent substrate 200, which are plane glass in this embodiment. In one embodiment, the first transparent substrate 100 and the second transparent substrate 200 can also be bend glass.

A functional stacked layer is sequentially deposited between the first transparent substrate 100 and the second transparent substrate 200, including a first conductive layer 105, an electrochromic stacked layer 110 and a second conductive layer 115. The thickness of the first conductive layer 105 and the second conductive layer 115 is 20 nm to 400 nanometers (nm), is 20 nm to 50 nm in one embodiment, is 50 nm to 100 nm in one embodiment, is 100 nm to 250 nm in one embodiment, and is 300 nm to 400 nm in one embodiment, where the sheet resistance should be 5 ohms to 25 ohms, and the average visible light transmittance is greater than 85 percent. The first conductive layer 105 and the second conductive layer 115 is one or more selected from an indium tin oxide (ITO), an aluminum-doped zinc oxide (AZO), a boron-doped zinc oxide (BZO) and a fluorine-doped tin oxide (FTO). The depositing mode can be selected from processes such as vacuum coating, evaporation coating, sol-gel coating, etc. In another embodiment of the disclosure, it is also possible not to deposit first conductive layer 105, and directly use coated glass coated with the above-mentioned material as the first transparent substrate 100.

The electrochromic stacked layer 110 is a conventional electrochromic element, including an electrochromic layer, an ion conduction layer and an ion storage layer. In the cases of a forward voltage and a backward voltage, the electrochromic stacked layer cooperate with the first conductive layer 105 and the second conductive layer 115, and can be reversibly switched between a colored state and a bleached state, the overall resistance of the electrochromic stacked layer is about 2 ohms to 10 ohms.

The bottom layer in the electrochromic stacked layer 110 is an electrochromic layer, which is deposited on the first conductive layer 105 by way of vacuum coating, evaporation coating and other methods, and the film thickness is 200 nm to 600 nm. The material is one or more selected from a tungsten oxide ($WO_3$), a molybdenum oxide ($MoO_3$), a niobium oxide ($Nb_2O_5$) and a titanium oxide ($TiO_2$).

Then, the ion conduction layer is deposited on the electrochromic layer and is used for communicating ions between the electrochromic layer and the ion storage layer. The material is preferably lithium metal, and the film thickness is 10 nm to 300 nm. In order to improve the stability of lithium ions and improve ion porosity to improve a transmission rate, materials such as tantalum, niobium, cobalt, aluminum, silicon, phosphorus, boron, and other materials can be doped in a lithium thin film layer.

Finally, the ion storage layer is deposited on the ion conduction layer and is used for storing lithium ions transferred from the electrochromic layer under the action of a voltage. The film thickness is 150 nm to 650 nm. The material of the ion storage layer is one or more selected from nickel oxides ($NiO_x$) and an iridium oxide ($IrO_2$).

Hence, the ion storage layer can contain an electrochromic material or a non-electrochromic material. If both the ion storage layer and the electrochromic layer are made of electrochromic materials, one of them is a cathodic coloring material while the other is an anodic coloring material. For example, the electrochromic layer can be made of a cathodic coloring material, such as a tungsten oxide; and the ion storage layer can be made of an anodic coloring material, such as nickel oxides. That is, after lithium ions leave the ion storage layer, the ion storage layer also enters the colored state. In this way, the electrochromic layer and the ion storage layer are combined, and together reduce the amount of light which is transmitted through the stacked layer.

Then, the functional stacked layer that covers the first conductive layer 110 is removed to expose part of the first conductive layer 110, so as to form the first exposed area. The first conductive material 130 is coated in the first exposed area, and is preferably a conductive silver slurry, the silver content of which is higher than 50 percent. The coating thickness is 0.1 mm to 0.5 mm, and the width of the first exposed area is about 90 micrometers to 120 micrometers (μm), so that the resistance of the first conductive material 130 is strictly controlled to be about 5 ohms, which is less than the resistance of the first conductive layer 110 and the second conductive layer 115. Certainly, the conductive slurry or the conductive adhesive can also be silver powder, nickel powder, copper powder, silver plating copper powder, carbon powder, etc. According to the materials used, the coating thickness of the first conductive material 130 and the width of the exposed area can both be adjusted according to the required resistance.

In order to enable the electrochromic stacked layer to form a loop, it is also necessary to coat the second conductive layer 115 with the first conductive material 130, preferably at the end that is away from the first exposed area.

Then, the second conductive material 135 is arranged along the periphery of the functional stacked layer between the first transparent substrate 100 and the second transparent substrate 200. The second conductive material 135 needs to be in contact with the first conductive material 130, and the resistance of the second conductive material should be greater than that of the first conductive material 130 and less than that of the first conductive layer 105 and the second conductive layer 115. The second conductive material is preferably a conductive silver slurry, the silver content of which is not higher than 30 percent. The coating thickness is 0.3 mm to 0.8 mm. Moreover, the second conductive material 135 seals the first transparent substrate 100 and the second transparent substrate 200, so that the functional stacked layer is not affected by the external environment, such as vapor, thereby prolonging the service life of the functional stacked layer and improving suitability for a usage environment.

After the device is powered on, a current enters the first conductive layer 105 through the first conductive material 130 from on one side of the second conductive material 135, then returns to the second conductive layer 115 through the electrochromic element 110, and enters the first conductive material 130 and the other side of the second conductive material 135 on, so as to form a loop. Since the resistance inside the electrochromic element<the resistance of the first conductive material<the resistance of the second conductive material<the resistance of the first conductive layer 105 and the second conductive layer 115, the current will not run away, and must pass through the electrochromic layer 110. Moreover, since a lead is connected outside the device rather than inside the device, there is no need to lead a lead out of the device, and the position of the lead does not need sealing processing, thereby ensuring the sealing performance inside vacuum glass while the procedure is simplified.

Hence, the position of the first exposed area can be any position, because the current always flows towards the first conductive material 130 and the electrochromic stacked layer 110 under the influence of resistance difference as long as the second conductive material 135 is in contact with the first conductive material 130.

Embodiment Two

Figure 2:
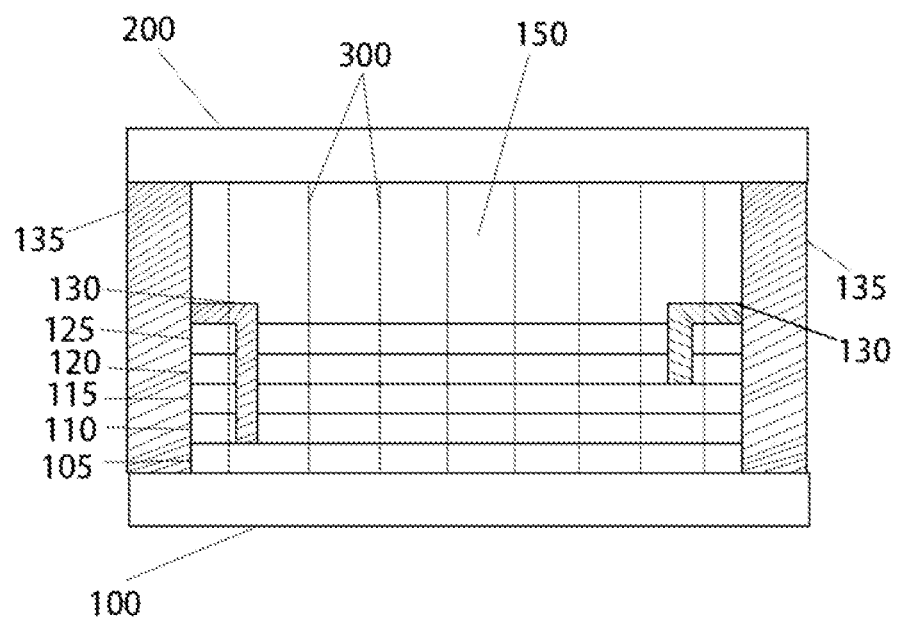
FIG. 2 is a structural schematic diagram of another embodiment of the disclosure.

FIG. 2 shows a structural schematic diagram of an electrochromic vacuum glass. As shown in FIG. 2, on the basis of FIG. 1, the structure further includes support columns 300, and the functional stacked layer further includes an ion blocking layer 120, an isolating layer 125 and a vacuum layer 150.

Due to the existence of the vacuum layer 150, the support columns 300 are introduced in order to prevent the first transparent substrate 110 and the second transparent substrate 200 from breaking caused by the difference of internal air pressure and external air pressure. The support columns 300 are uniformly distributed and pasted in an array on the first transparent substrate 100, and the support columns 300 are perpendicularly connected to both the first transparent substrate 100 and the second transparent substrate 200. The height of the support column 300 is preferably 0.2 mm to 0.5 mm, depending on the thickness of the vacuum layer 150 and the functional stacked layer.

Moreover, the introduction of the vacuum layer 150 greatly prolongs the service life of an electrochromic film layer and improves the reliability thereof, which also achieves the effects of energy saving, thermal insulation, sound insulation and noise reduction, and condensation free of vacuum glass. Similarly, the vacuum layer 150 can also be replaced by an insert gas protection layer, such as an argon protection layer, so as to achieve the effect similar to the above-mentioned effects.

Furthermore, the support column 300 contains a third conductive material, which is preferably metal or a conductive polymer, such as silver, platinum, copper or conductive ceramics. The support column serves as a good electric conductor. When the device is powered on, part of a current passes through the first conductive layer 105, and is transmitted to the second conductive layer 115 through multiple support columns 300, which makes the current diffuse more quickly, thus improving the color change uniformity.

Optionally, the ion blocking layer 120 and the isolating layer 125 are also sequentially arranged under the second conductive layer 115 to serve as additional functional layers. The ion blocking layer 120 uses silicon (Si) or silicon-aluminum (SiAl) target material, the thickness is 20 nm to 80 nm, and the components include silicon oxide ($SiO_x$) and silicon-aluminum oxide ($SiAlO_x$). Since aluminum has good compactness, the migration of sodium and magnesium in glass can be effectively blocked, and the adhesion of an electrochromic thin film on the glass is improved, such that the electrochromic thin film is so as not to be peeled off.

The film thickness of the isolating layer 125 is 100 nm to 1000 nm, and the isolating layer 125 can be one or more of titanium nitride, aluminum nitride, silicon nitride and boron nitride. These materials have greater transparency and higher resistance, which enables a current unlikely to run away after the device is powered on, and can also protect functional layers deposited under the materials, thereby reducing physical and chemical loss of the functional layers.

Since the ion blocking layer 120 and the isolating layer 125 additionally cover the second conductive layer 115, there is a need to remove the functional stacked layer that covers the second conductive layer 115, preferably remove the functional stacked layer at the end of the second conductive layer 115 that is away from the first exposed area, so that part of the second conductive layer 115 is exposed to form the second exposed area. The first conductive material 130 is coated in the second exposed area, and is in contact with the second conductive material 135.

During operation, the device can reversibly be in the bleached state and in the colored state in a cycle manner. In the bleached state, a voltage is applied to the first conductive layer 105 and the second conductive layer 115, such that lithium ions in the electrochromic stacked layer mainly resides in the ion storage layer. At this time, if the electrochromic layer contains a cathodic electrochromic material, the device is in the bleached state. When the voltage potential on the electrochromic stacked layer 110 is reversed, the lithium ions cross the ion conduction layer and enter the electrochromic layer, such that the device is converted into the colored state.

When the voltage applied to the device is reversed again, the ions leave the electrochromic layer, and return to the ion storage layer through the ion conduction layer. In this way, the device is converted into the bleached state. According to different voltage control, an electrochromic apparatus can not only be switched between the bleached state and the colored state, but also be converted into one or more intermediate color states between the bleached state and the colored state.

Embodiment Three

The disclosure also provides a method for manufacturing electrochromic glass, the method including the following steps.

At step S101, a support column array is pasted on a first transparent substrate.

A high-temperature-resistant adhesive is applied on a cleaned first transparent substrate 100 via a glue dispenser, so as to form a regular and uniform array, and the support columns are then bonded to glass via the high-temperature-resistant adhesive.

At step S102, a functional stacked layer is formed, electrochromic stacked layer is deposited on the first transparent substrate that is provided with a first conductive layer, and a second conductive layer is deposited on the electrochromic stacked layer.

The first conductive layer 105 can be directly deposited on the first transparent substrate 100 by using process such as vacuum coating, evaporation coating, sol-gel coating and other processes, and it is also possible to directly deposit an electrochromic stacked layer 110 on the first transparent substrate 100 with the first conductive layer 105.

The electrochromic stacked layer 110 is provided with an electrochromic layer, an ion conduction layer and an ion storage layer. Firstly, an electrochromic layer is formed on the first conductive layer 105 by using method such as vacuum coating, evaporation coating and other methods. Reactive sputtering can be performed by doping argon with oxygen via metal target material such as tungsten, molybdenum, niobium, titanium, etc. In order to effectively control an oxidation valence state to achieve the optimal color change effect, the oxygen doping proportion is 2% to 50%. It is also possible to perform sputtering directly via a ceramic target material of a metallic oxide.

Then, a metallic lithium ion conduction layer is formed on the electrochromic layer by using method such as vacuum coating.

Finally, an ion storage layer is formed on the ion conduction layer by using the method such as vacuum coating, evaporation coating, electrochemical depositing, etc. It is possible to select a metal target of nickel or iridium and dope argon with oxygen to perform reactive sputtering, with the oxygen doping proportion being 0.5% to 20%. For the metallic oxide obtained at this time, for example, nickel oxide, the nickel thereof is divalent, the color is lighter, and the light transmittance of a transparent substrate is retained as much as possible. In addition, it is also possible to directly perform sputtering via a ceramic target material of a metallic oxide.

The deposition mode of the second conductive layer 115 is the same as that of the first conductive layer 105, which will not be described herein.

Optionally, one ion blocking layer 120 is deposited on the second conductive layer 115 by taking silicon or a mixture of silicon and aluminum as target materials and by using method such as vacuum coating and evaporation coating, serving as an additional functional layer.

Furthermore, the isolating layer 125 is deposited on the ion blocking layer 120 in a nitrogen atmosphere by taking pure or mixture of titanium, aluminum, silicon and boron as target materials, serving as an additional functional layer.

In one embodiment, the first conductive layer 105, the electrochromic stacked layer 110, the second conductive layer 115, the ion blocking layer 120 and the isolating layer 125 serve as a functional stacked layer, and are formed on a deposition system once. When a functional layer is being deposited, the first transparent substrate 100 does not leave the deposition system.

At step S103, a first exposed area is formed at the first conductive layer, and a second exposed area is formed at the end of the second conductive layer that is away from the first exposed area.

After the deposition of the functional stacked layer is completed, it is necessary to perform electrode scribing on the electrochromic glass device that has finished deposition, remove part of a functional layer that covers the first conductive layer 105 and the second conductive layer 115 to respectively form the first exposed area of the first conductive layer 105 and the second exposed area of the second conductive layer 115. The second exposed area is preferably at the end of the second conductive layer 115 that is away from the first exposed area. The electrode scribing may use guiding and focusing energy of which wavelength is one of 248 nm, 355 nm (ultraviolet laser (UV)), 1030 nm (infrared laser (IR), for example, disk laser), 1064 nm (for example, neodymium-doped yttrium-aluminum garnet (Nd:YAG) laser) and 532 nm (for example, green laser), so as to remove part of the functional layer. The laser which wavelength is 1064 nm or 532 nm is preferred, because the absorption of the functional layer is better under the above-mentioned wavelengths, which can perform high-quality scribing on the functional layer, and there will be no residual by-product at a scribing position after the removal of the functional layer.

At step S104, the first conductive material is coated in the first exposed area and the second exposed area.

The first conductive material 130, preferably a conductive silver slurry, is coated on surfaces of the first exposed area and the second area by using glue-dispensing process.

At step S105, the second conductive material is coated along the periphery of the functional stacked layer, and the second conductive material is in contact with the first conductive material.

The second conductive material 135 is coated along a peripheral surface of the functional stacked layer by using the process such as glue dispensing, screen printing and other processes, and preliminary edge sealing is performed on the glass.

At step S106, a second transparent substrate and the first transparent substrate are aligned, and then heated and sealed in vacuum.

Vacuum air exhaust and sintering bonding are performed, by using a vacuum sintering furnace, on the device after the preliminary edge sealing, the vacuum pressure is 6 kPa to 105 kPa. During the vacuum air exhausting process, the glass is heated, the heating temperature is 280 to 350° C. The time for heating, sheet combining and air exhaust is 60 minutes to 120 minutes, and then finished electrochromic vacuum glass can be obtained.

In another embodiment, at step S106, after the second transparent substrate and the first transparent substrate are aligned, an insert gas is filled, heating and sealing are performed in an insert gas atmosphere, the insert gas is preferably argon.

Finally, an electrochromic function of the electrochromic vacuum glass can be implemented after a lead and a low-voltage power source are connected to the second conductive material layer of the finished device.

The preferred embodiments of the disclosure have been described in detail above. It should be understood that a person of ordinary skill in the art would be able to make various modifications and variations according to the concept of the disclosure without any inventive effort. Therefore, any solution that can be obtained by a person skilled in the art by means of logical analysis, reasoning or limited trials on the basis of the prior art and according to the concept of the disclosure should be included within the scope of protection of the claims.

The invention claimed is:

1. An electrochromic glass, comprising a first transparent substrate, a second transparent substrate and a functional stacked layer, the functional stacked layer comprises a first conductive layer, an electrochromic stacked layer and a second conductive layer;
   the first conductive layer, the electrochromic stacked layer and the second conductive layer are sequentially arranged on the first transparent substrate and are located between the first transparent substrate and the second transparent substrate;
   the first conductive layer is provided with a first exposed area, a first conductive material is arranged in the first exposed area, and the end of the second conductive layer that is away from the first exposed area is provided with the first conductive material; and
   a second conductive material is arranged between the first transparent substrate and the second transparent substrate, the second conductive material is arranged along the periphery of the functional stacked layer, the second conductive material is in contact with the first conductive material, and the second conductive material is in sealed connection with both the first transparent substrate and the second transparent substrate;
   After the device is powered on, a current enters the first conductive layer through the first conductive material from on one side of the second conductive material, then returns to the second conductive layer through the electrochromic element, and enters the first conductive material and the other side of the second conductive material on, so as to form a loop;
   the resistance of the electrochromic stacked layer<the resistance of the first conductive material<the resistance of the second conductive material<the resistance of the first conductive layer and the resistance of the second conductive layer.

2. The electrochromic glass according to claim 1, wherein the functional stacked layer further comprises an inert gas layer, which is located between the functional stacked layer and the second transparent substrate.

3. The electrochromic glass according to claim 1, wherein a support column array is arranged between the first transparent substrate and the second transparent substrate, the support column array comprises support columns, which are uniformly distributed, and the support columns are perpendicularly connected to the first transparent substrate and the second transparent substrate.

4. The electrochromic glass according to claim 3, wherein the support column contains a third conductive material.

5. The electrochromic glass according to claim 3, wherein the functional stacked layer further comprises a vacuum layer, which is located between the functional stacked layer and the second transparent substrate.

6. The electrochromic glass according to claim 1, wherein the functional stacked layer further comprises an ion blocking layer; and
   the ion blocking layer contains a silicon oxide or a silicon aluminum oxide, the ion blocking layer is arranged on the second conductive layer, the end of the second conductive layer that is away from the first exposed area is provided with a second exposed area, and the first conductive material is arranged in the second exposed area.

7. The electrochromic glass according to claim 6, wherein the functional stacked layer further comprises an isolating layer; and
   the isolating layer is arranged on the ion blocking layer, and components of the isolating layer contain at least one of the following: titanium nitride, aluminum nitride, silicon nitride and boron nitride.

8. The electrochromic glass according to claim 1, wherein the first conductive material and the second conductive material comprise a conductive slurry or a conductive adhesive, the conductive slurry and the conductive adhesive contain one or more of silver powder, nickel powder, copper powder, silver plating copper powder and carbon powder.

9. A method for manufacturing an electrochromic glass, comprising:
   forming a functional stacked layer, depositing an electrochromic stacked layer on a first transparent substrate with a first conductive layer, and depositing a second conductive layer on the electrochromic stacked layer;
   forming a first exposed area on the first conductive layer;
   coating a first exposed area with a first conductive material;
   coating, with the first conductive material, the end of the second conductive layer that is away from the first exposed area;
   coating along the periphery of the functional stacked layer with second conductive material, the second conductive material is in contact with the first conductive material; and
   aligning, heating and sealing a second transparent substrate with the first transparent substrate in a sealed manner.

10. The method for manufacturing electrochromic glass according to claim 9, wherein, when the second transparent substrate and the first transparent substrate are aligned, heated and sealed, the heating and sealing are performed in an insert gas atmosphere.

11. The method for manufacturing electrochromic glass according to claim 9, wherein, before the functional stacked layer is formed, the method further comprises:
   pasting a support column array on the first transparent substrate, wherein the support column array includes support columns, which are uniformly distributed, and the support columns are perpendicularly connected to the first transparent substrate and the second transparent substrate.

12. The method for manufacturing electrochromic glass according to claim 11, wherein, when the second transparent substrate and the first transparent substrate are aligned, heated and sealed, the heating is vacuum heating.

13. The method for manufacturing electrochromic glass according to claim 9, wherein forming the functional stacked layer further comprises:
   depositing an ion blocking layer on the second conductive layer by taking silicon or a mixture of silicon and aluminum as a target material, after the second conductive layer is deposited on the electrochromic stacked layer;
   coating, with the first conductive material, the end of the second conductive layer that is away from the first exposed area specifically includes
   forming a second exposed area at the end of the second conductive layer that is away from the first exposed area; and
   coating the second exposed area with the first conductive material.

14. The method for manufacturing electrochromic glass according to claim 13, wherein forming the functional stacked layer further comprises:
   depositing an isolating layer on the ion blocking layer in a nitrogen atmosphere by taking pure or mixture of titanium, aluminum, silicon and boron as a target material, after the ion blocking layer is deposited on the second conductive layer.

* * * * *